United States Patent [19]

Suzuki et al.

[11] Patent Number: 4,507,932
[45] Date of Patent: Apr. 2, 1985

[54] CONTROL SYSTEM FOR AIR CONDITIONING SYSTEMS

[75] Inventors: Nobuhiko Suzuki; Shinji Sutoh; Masaya Sasaki, all of Konan, Japan

[73] Assignee: Diesel Kiki Co., Ltd., Tokyo, Japan

[21] Appl. No.: 577,137

[22] Filed: Feb. 6, 1984

[30] Foreign Application Priority Data

Feb. 14, 1983 [JP] Japan .................. 58-22525

[51] Int. Cl.³ ............................................. F25D 17/00
[52] U.S. Cl. ............................... 62/180; 62/227; 62/228.3
[58] Field of Search ............. 62/228.3, 180, 186, 62/227

[56] References Cited

U.S. PATENT DOCUMENTS 4,003,729  1/1977  McGrath .................... 62/186 X

FOREIGN PATENT DOCUMENTS 151826  11/1981  Japan ....................... 62/180
1587111  4/1981  United Kingdom .

Primary Examiner—William E. Wayner
Attorney, Agent, or Firm—Frishauf, Holtz, Goodman and Woodward

[57] ABSTRACT

A control system for controlling an air conditioning system having a variable delivery compressor and an evaporator for cooling and dehumidifying air supplied thereto from a blower. The control system comprises sensor means for sensing the evaporator boiling pressure, determining means for determining whether or not the detected value of evaporator boiling pressure has reached either a predetermined upper limit or a predetermined lower limit, and control means for controlling the capacity of the compressor over its maximum variable range and also the quantity of air supplied from the blower so as to maintain the evaporator boiling pressure at one of the predetermined upper and lower limits which is determined to have been reached by the detected boiling pressure value.

9 Claims, 9 Drawing Figures

CONTROL SYSTEM FOR AIR CONDITIONING SYSTEMS

BACKGROUND OF THE INVENTION

This invention relates to an air conditioning system particularly adapted for use in an automotive vehicle, and more particularly to a control system for an air conditioning system of this kind, which is adapted to control both the capacity of the compressor and the quantity of air being supplied to the evaporator so as to maintain the evaporator boiling pressure within a desired range.

Air conditioning systems for automotive vehicles include a type equipped with a control system for controlling the refrigeration capacity of the air conditioning system in response to heat loads thereon. One of such control systems is known from British patent specification No. 1,587,111, which controls the evaporator boiling pressure by regulating the capacity of a variable delivery compressor in response to the difference between a detected value of the compartment temperature and a preset value thereof. Further, the British patent specification points out a problem that a too high evaporator boiling pressure causes a degradation in the dehumidifying capacity to thereby impede a required dehumidifying action, whereas a too low evaporator boiling pressure causes freeze-up of the evaporator, and it provides a solution to this problem, which comprises detecting the evaporator boiling pressure to control the same pressure to values within a predetermined or desired range. According to this proposed control system, in order to control the evaporator boiling pressure, the capacity of the compressor alone is varied in response to the heat load requirements while maintaining the flow rate of air passing over the evaporator at a certain value. However, the range of capacity of the compressor is limited that can be controlled for ensuring required dehumidifying capacity of the evaporator and prevention of freeze-up of the evaporator. Therefore, if the evaporator boiling pressure lies outside the controllable range of the compressor capacity, there will take place overcooling or poor cooling.

SUMMARY OF THE INVENTION

It is an object of the invention to provide a control system for an air conditioning system, which is adapted to control both the capacity of the compressor and the quantity of air being supplied to the evaporator so as to balance the refrigeration capacity of the evaporator with the heat load, to thereby ensure proper dehumidification as well as prevent evaporator freeze-up, consequently providing a pleasant feeling of cooling.

It is another object of the invention to provide a control system for an air conditioning system, which is capable of controlling the capacity of the compressor over its maximum variable range, thereby reducing loads on the engine which drives the compressor and accordingly saving the energy to be consumed by the engine.

According to the invention, a control system for an air conditioning system is provided, which has a compressor having a variable delivery or capacity, blower means adapted to supply a variable amount of air, and an evaporator for cooling and dehumidifying air supplied from the blower means. The evaporator has its boiling pressure variable in response to the capacity of the compressor and an air quantity supplied from the blower means.

The control system comprises: sensor means for detecting the boiling pressure of the evaporator; setting means for setting an upper limit and a lower limit defining a predetermined range of the boiling pressure of the evaporator; determining means for determining whether or not the boiling pressure of the evaporator has reached either the upper limit of the above predetermined range or the lower limit thereof; and control means. The control means is operable to control the capacity of the compressor over a maximum variable range thereof and simultaneously control the air quantity supplied from the blower means so that the boiling pressure of the evaporator is maintained at one of the upper limit of the above predetermined range and the lower limit thereof, when it is determined by the determining means that a value of the boiling pressure of the evaporator detected by the sensor means has reached the above one of the upper limit of the predetermined range and the lower limit thereof.

The above and other objects, features and advantages of the invention will be more apparent from the ensuing detailed description taken in conjunction with the accompanying drawings.

DETAILED DESCRIPTION

Figure 1:
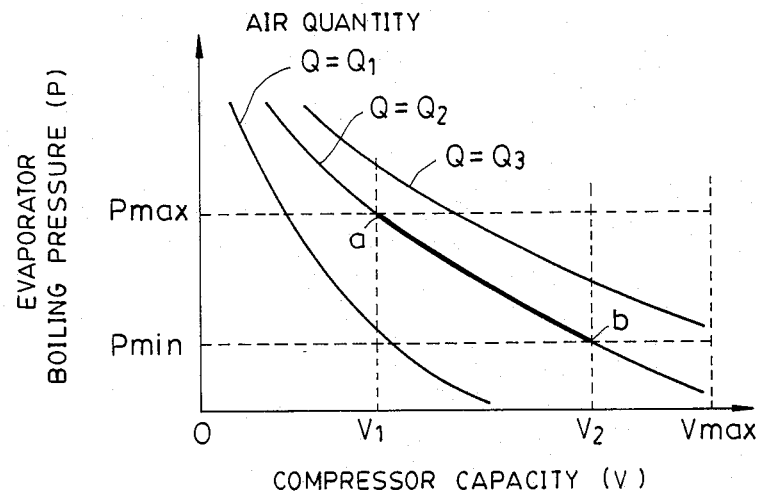
FIG. 1 is a graph showing control characteristics of a conventional control system for air conditioning systems.

Referring first to FIG. 1, there are shown control characteristics of a conventional control system for air conditioning systems, e.g. disclosed by British Pat. No. 1,587,111, hereinbefore referred to. As shown in the figure, the evaporator boiling pressure P is given as a function of the quantity of air Q being supplied to the evaporator and the capacity V of the compressor (in volume). According to the graph of FIG. 1, insofar as the air quantity Q remains constant, the evaporator boiling pressure P decreases as the compressor capacity V increases. Also, insofar as the compressor capacity V remains constant, the evaporator boiling pressure P increases as the air quantity Q increases. In the graph, a relationship of $Q1<Q2<Q3$ stands. The boiling pressure value Pmax represents a maximum allowable value for ensuring proper dehumidifying capacity of the evaporator, and the value Pmin a minimum allowable value for preventing freeze-up of the evaporator, respectively.

According to the control system disclosed by the British Patent, the evaporator boiling pressure P is adjusted by varying the compressor capacity V in response to the heat load while maintaining the air quantity Q at a certain value, for instance the value Q2. If the air quantity Q is maintained at a fixed value as above, the evaporator boiling pressure P reaches the maximum value Pmax or the minimum value Pmin, respectively, when the compressor capacity V assumes an intermediate value V1 or V2 between which proper dehumidifying capacity can be obtained and evaporator freeze-up can be avoided. Therefore, the range of compressor capacity V that can be varied is conventionally limited to the range falling between the values V1, V2, even though the compressor capacity V per se can really be varied from zero to the maximum value Vmax. Consequently, if the heat load on the evaporator lies outside the controllable range defined by the limits a and b of compressor capacity V, the refrigeration capacity of the evaporator cannot be matched to the heat load, resulting in overcooling or poor cooling.

Figure 2:
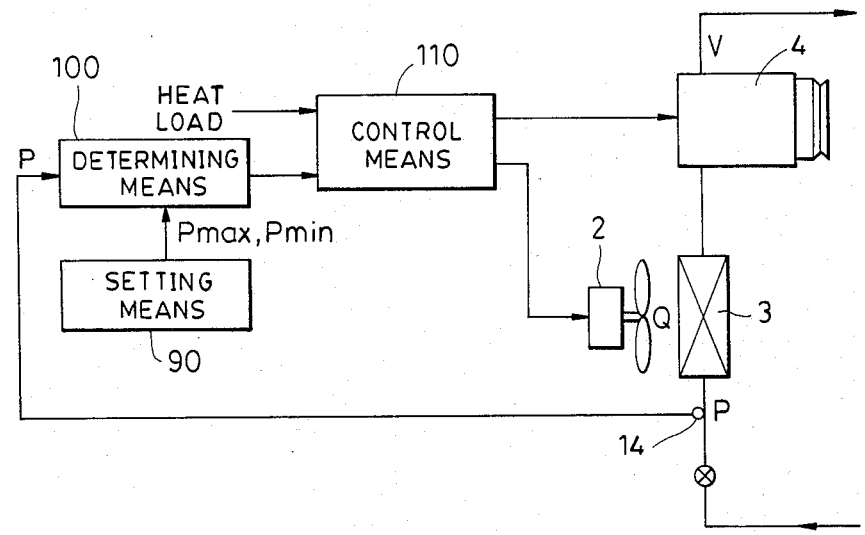
FIG. 2 is a block diagram illustrating a basic arrangement of a control system for air conditioning systems, according to the present invention.

Referring next to FIG. 2, there is illustrated a basic arrangement of a control system for automotive air conditioning systems, according to the present invention. In an air conditioning system applied, air is supplied from a blower 2 to an evaporator 3 and cooled and dehumidified by the latter. A variable delivery compressor 4 cooperates with the evaporator 3 to form part of a closed refrigerating circuit. The boiling pressure P of the evaporator 4 varies in response to the capacity V of the compressor 4 and the air quantity Q supplied from the blower 2 to the evaporator 3.

When the evaporator boiling pressure P lies within a controllable range for ensuring proper dehumidification of the cooled air and prevention of freeze-up of the evaporator, that is, a range between maximum and minimum allowable values Pmax and Pmin which have previously been set by setting means 90, control means 110 controls the evaporator boiling pressure P in normal control mode I. To be specific, the capacity V of the compressor 4 is adjusted in response to heat loads so as to maintain the boiling pressure P of the evaporator 3 between the values Pmax and Pmin. At the same time, the air quantity Q supplied from the blower 2 is set to a predetermined value. The boiling pressure P of the evaporator 3 is detected by a boiling pressure sensor 14, and the detected value is supplied to determining means 100, which determines whether or not the input detected value of boiling pressure P has reached either the maximum allowable value Pmax or the minimum allowable value Pmin. If it is determined by the determining means 100 that the detected boiling pressure value has reached one of the two values Pmax, Pmin, the control means 110 is shifted to another control mode II wherein it controls both the capacity V of the compressor 4 and the air quantity Q being supplied to the evaporator 3 so as to maintain the evaporator boiling pressure P at the value Pmax or the value Pmin which is determined to have been reached.

Figure 3:
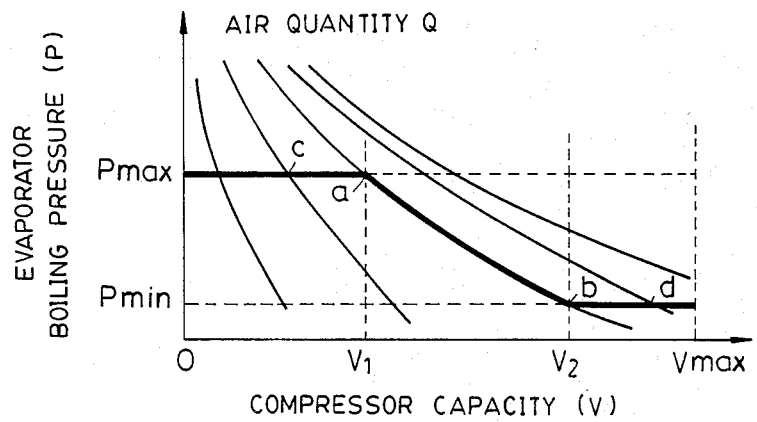
FIG. 3 is a graph showing control characteristics of the control system according to the present invention.

Therefore, the control system according to the invention has control characteristics as shown in Fig. 3. It will be learned from the graph that once the compressor capacity V has reached the controllable limit a or b of the conventional control system as a result of control in control mode I, control in control mode II is effected wherein the compressor capacity V and the air quantity Q are both varied so that the evaporator boiling pressure P is maintained at the value Pmax or Pmin. Thus, according to the invention, it is not only possible to ensure proper dehumidification of the cooled air and prevent freeze-up of the evaporator but also achieve a balance between the heat load on the evaporator and the refrigeration capacity even at the point c or d in the graph when the compressor capacity V exceeds the range defined by the values V1, V2, thereby avoiding overcooling and poor cooling.

Figure 4:
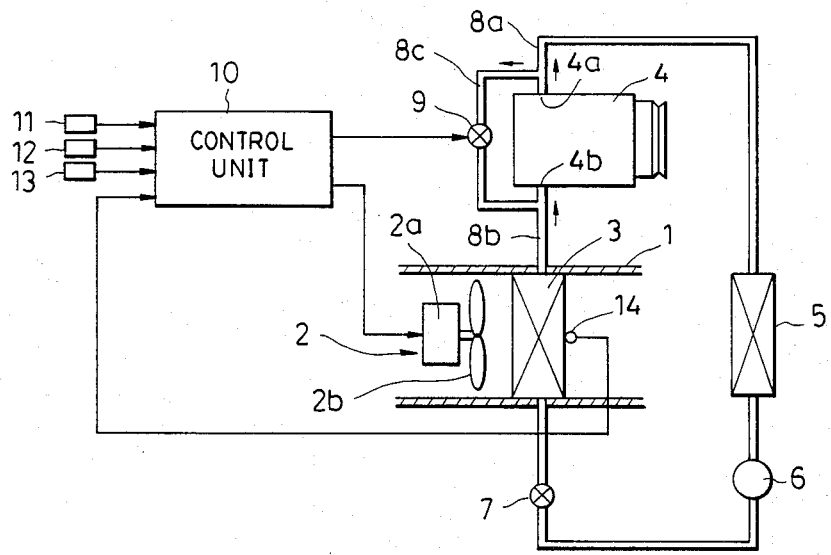
FIG. 4 is a block diagram illustrating a control system for an air conditioning system for automotive vehicles, according to an embodiment of the invention.
Figure 5:
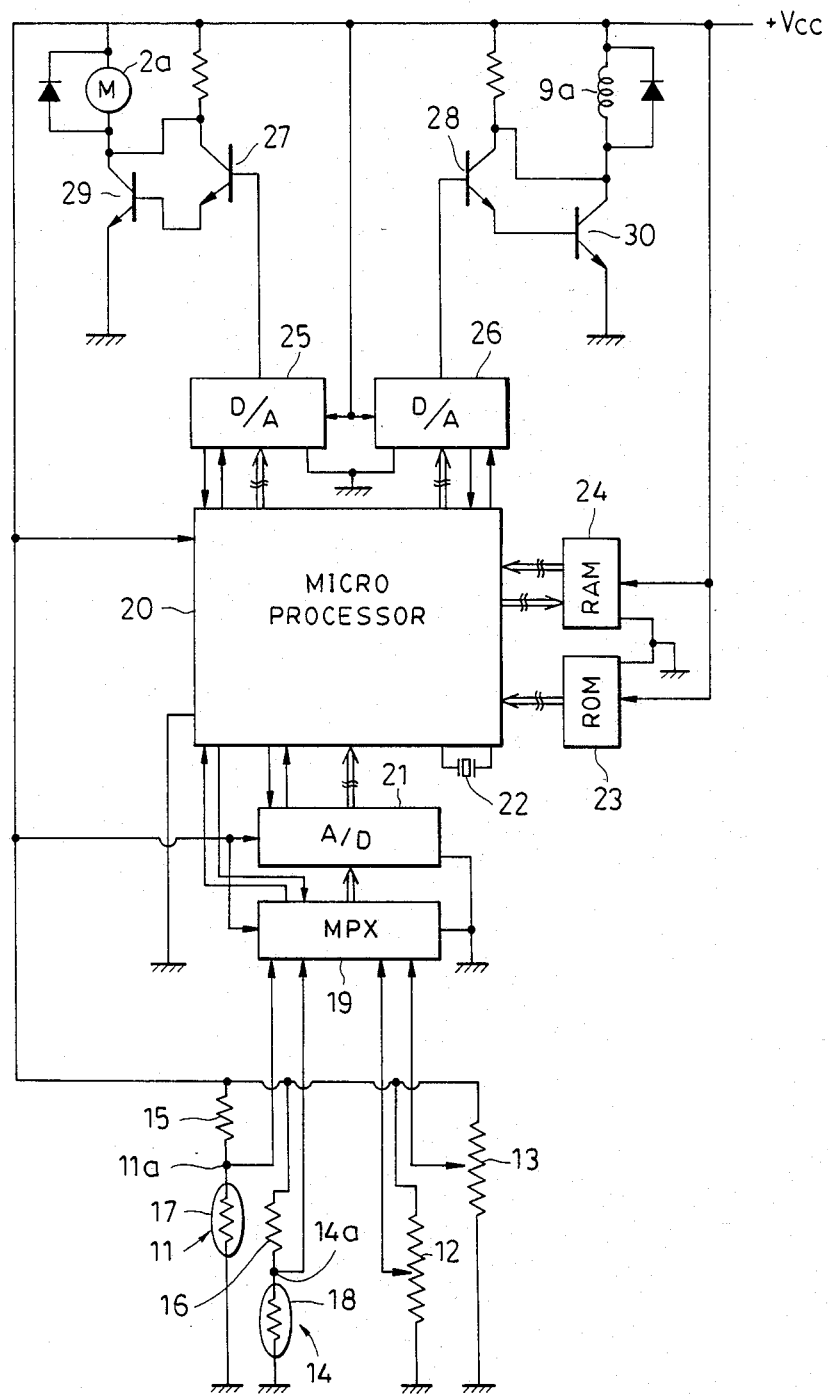
FIG. 5 is a circuit diagram showing an electrical circuit employed in the control system of FIG. 4.
Figure 6A:
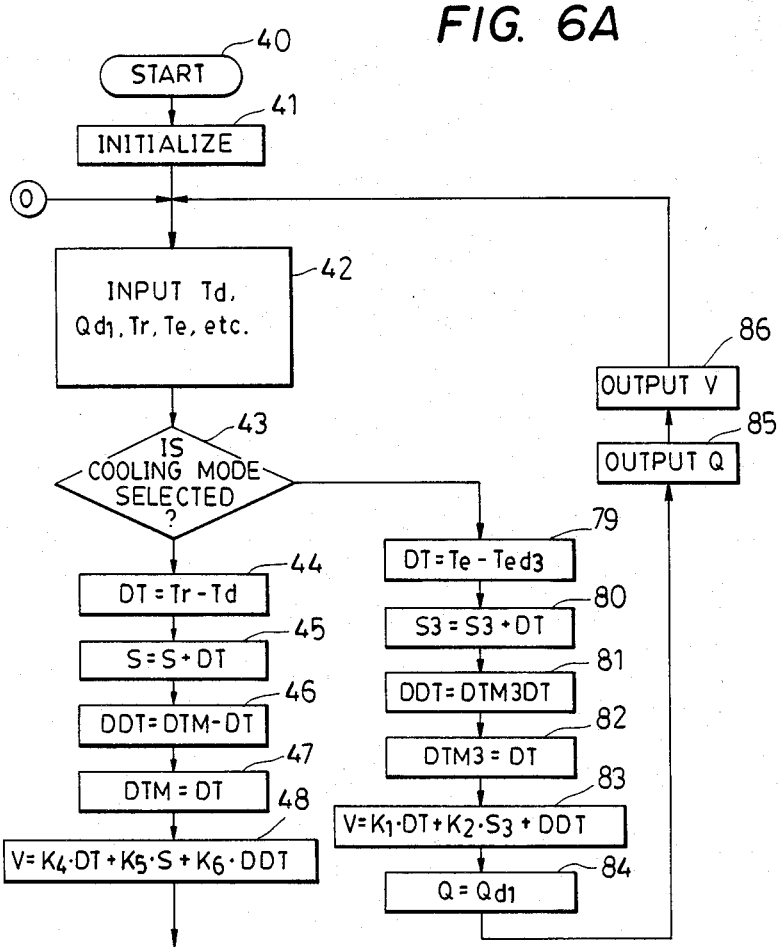
FIGS. 6, 6A & 6B are flow charts showing a control program which is executed by the control system of FIG. 5.
Figure 6:
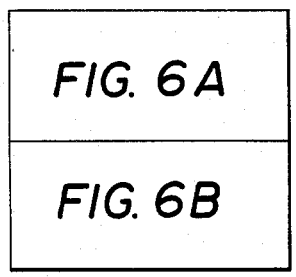
Figure 6B:
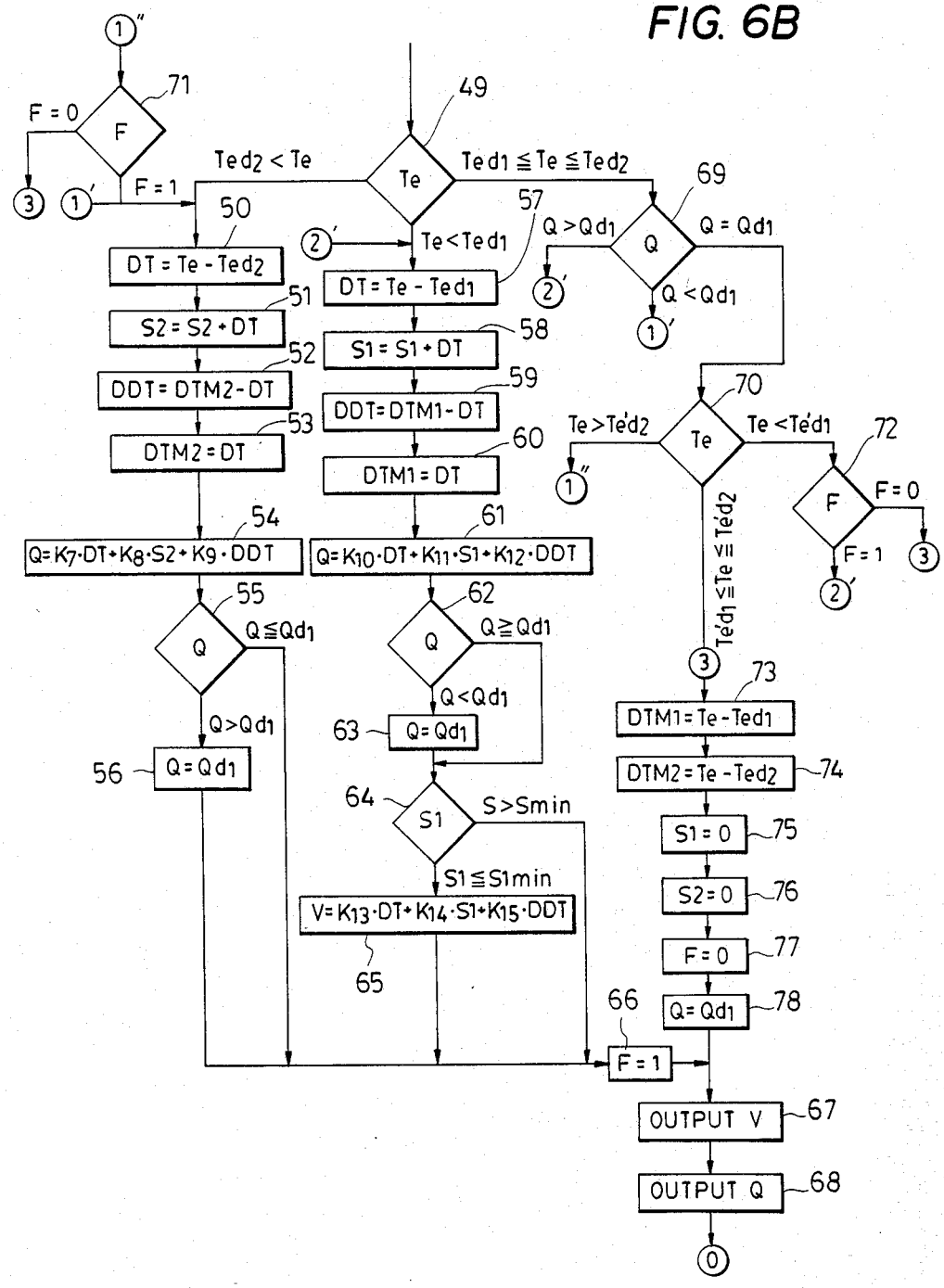

FIGS. 4 through 6 show an embodiment of the control system according to the invention. An air conditioning system for automotive vehicles, to which the control system is applied, has a casing 1 in which are arranged a blower 2 and an evaporator 3. The blower 2, which comprises a motor 2a and a fan 2b rotatively driven by the motor 2a, is located upstream of the evaporator 3 and sucks air (fresh air or recirculated air) into the casing through an upstream end opening thereof and feeds it to the evaporator 3. A closed refrigerating circuit is formed by the evaporator 3, a variable delivery compressor 4, a condenser 5, a liquid tank 6, and an expansion valve 7. A discharge passage 8a and a suction passage 8b are connected, respectively, to the inlet 4a and outlet 4b of the compressor 4, and are also connected to each other via a bypass 8c across which is disposed a solenoid-operated control valve 9. The capacity V of the compressor 4 can be controlled in a continuous manner by varying the valve opening of the control valve 9 such that part of the compressed refrigerant gas discharged from the compressor 4 is returned to the suction side of same through the bypass 4c in a quantity corresponding to the valve opening of the control valve 9.

The control system according to the invention includes a control unit 10 as a main component, which has a micro processor 20 incorporated therein. A compartment temperature sensor 11, a temperature setter 12, an air quantity setter 13, and a fin temperature sensor 14 are connected to the input of the control unit 10, the output of which is connected to the blower 2 and the control valve 9.

The compartment temperature sensor 11 senses the temperature Tr in the compartment of an associated vehicle as representative of a discharge air temperature of the air conditioning system, and generates a signal indicative of a detected compartment temperature value. The temperature setter 12 and the air quantity setter 13 are used to set respective desired values Td and Qd1 of the compartment temperature Tr and the air quantity Q fed to the evaporator 3 and generate signals indicative of the set desired values. The fin temperature sensor 14 senses the temperature of one of cooling fins of the evaporator 3 and generates a signal indicative of a sensed fin temperature value. This fin temperature sensor 14 forms an evaporator boiling pressure sensor, since the fin temperature is proportional to the boiling pressure P of the evaporator 3.

The control unit 10 is supplied with various signals as above, calculates the amounts of controlling the blower 2 and the control valve 9 on the basis of values of the input signals, and supplies the resulting control signals to them. The blower 2 has its rotational speed varied in response to the corresponding control signal for control of the air quantity Q being fed to the evaporator 3, while the control valve 9 has its valve opening varied in response to the corresponding control signal for control of the capacity V of the compressor 4.

FIG. 5 shows an electrical circuit employed in the control unit, by way of example. The compartment temperature sensor 11 is composed of a resistance 15 connected at one end to a power supply, not shown, and a thermo-sensitive device 17 such as a thermistor, connected at one end to the resistance 15 and grounded at the other end. The junction 11a of the two members 15, 17 is connected to the input of a multiplexer 19 such that the voltage at the junction 11a is supplied to the latter as a compartment temperature signal. The fin temperature sensor 14 has a similar construction to the compartment temperature sensor 11, also composed of a resistance 16 and a thermo-sensitive device 18 such as a thermistor and also connected to the multiplexer 19 so as to supply same with a fin temperature signal in the form of a voltage at the junction 14a of the two members 16, 18. The temperature setter 12 and the air quantity setter 13 are each formed of a variable resistor and are disposed to supply the multiplexer 19 with signals indicative of respective set temperature and air quantity values in the form of voltages at their respective movable contacts. The multiplexer 19 is responsive to a command signal from the micro processor 20 to supply the above various analog signals to an analog-to-digital converter 21, in a successive manner, which in turn successively converts the input analog signals into respective corresponding digital signals and applies same to the micro processor 20.

Connected to the micro processor 20 are a crystal oscillator 22 for generating clock pulses, a read-only memory (ROM) 23 which stores a control program, described later, and predetermined value data, and a random access memory (RAM) 24 for temporarily storing various data. These members cooperate to form a microcomputer. Various calculations are effected within the micro processor 20, in accordance with the control program read from the ROM 23, and the resulting control signals in the form of digital signals for controlling the blower 2 and the control valve 9 are supplied from the micro processor 20 and converted into respective corresponding analog signals by digital-to-analog converters 25 and 26. The analog control signals from the digital-to-analog converters 25, 26 are applied, respectively, to the base of a transistor 27 forming part of a blower driving circuit and the base of a transistor 28 forming part of a control valve driving circuit. The transistors 27, 28 amplify the voltages of their respective input control signals which are further amplified by further transistors 29 and 30 connected to the emitters of their respective transistors 27, 28, and are then applied, respectively, to the motor 2a of the blower 2 and the solenoid 9a of the control valve 9. In this way, the rotational speed of the motor 2a of the blower 2 or the air quantity Q, and the valve opening of the conrol valve 9 or the compressor capacity V are controlled to values dependent upon the aforementioned input parameter signals.

A mode selector lever, not shown, is provided in the compartment of an automotive vehicle concerned to be operated by the driver to select a cooling mode or a dehumidifying mode, and a lever position sensor, not shown, indicative of the selected mode position of the mode selector lever is connected to the input of the control unit 10 in FIG. 4.

FIG. 6 shows a flow chart of the control program stored in the aforementioned ROM 23. When the power supply is turned on, the micro processor 20, which is adapted to execute the control program in synchronism with generation of each pulse of a control signal having a predetermined pulse repetition period, starts executing the program at step 40, and initializes the control unit 10 by clearing stored values in the RAM 24, etc. at step 41. At the following step 42, the micro processor 20 applies a command signal to the multiplexer 19 to cause same to successively supply the micro processor with data such as compartment temperature Tr, set temperature Td, fin temperature Te, and set air quantity Qd1 through the analog-to-digital converter 21, and the micro processor 20 stores these input data into the RAM 24 at respective predetermined addresses. In step 43, it is determined from the output signal from the lever position sensor whether or not the cooling mode has been selected. If the cooling mode has been selected, the program proceeds to the step 44.

Steps 44-48 execute control of the capacity V of the variable delivery compressor 4, wherein correction terms, i.e. proportional, integral and differential correction terms are obtained from the actual capacity value V and a desired capacity value Vd is calculated by the use of these correction terms. To be specific, at step 44, a difference DT between the compartment temperature Tr and a set value Td is obtained, and the difference DT obtained in the present loop replaces old one stored in the RAM 24 at a predetermined address. In step 45, the difference DT is added to a sum S of such difference values DT, obtained in the preceding loop to obtain a new sum S which replaces the above sum in the preceding loop stored in the RAM at a predetermined address. In step 46, the difference DT obtained in the present loop is subtracted from a difference DTM between the compartment temperature Tr and the set value Td obtained in the preceding loop, to obtain a differential value DDT, and this new differential value DDT replaces old one stored in the RAM at a predetermined address. In step 47, the difference DT obtained in the present loop is stored into the RAM in place of the old difference DTM. In step 48, the capacity V of the compressor is determined from the following equation (1):

$$V = K4 \times DT + K5 \times S + K6 \times DDT \qquad (1)$$

where K4, K5 and K6 are constants which are determined experimentally.

The above determined capacity V assumes a value corresponding to the difference between the compartment temperature Tr and the set value Td and suitable to obtain a balance between the heat load on the evaporator 3 and the refrigeration capacity of the evaporator insofar as the air quantity Q is maintained at the predetermined value Qd1. Usually, the determined value V is directly outputted as a control value for the compressor 4, to which the compressor is controlled.

However, as stated before, if the air quantity Q is maintained at the predetermined value Qd1 (equivalent to Q2 in FIG. 1), proper dehumidification of the cooled air will be impossible to achieve, or freeze-up of the evaporator 3 will take place when the capacity V of the compressor 4 becomes out of the range between the values V1, V2. To avoid this, according to the invention, the control is effected in different control mode II than normal control mode I as follows, so as to obtain control characteristics shown in FIG. 7.

First, in step 49, a detected fin temperature value Te is compared with a predetermined lower limit Ted1 and a predetermined upper limit Ted2 which correspond, respectively, to the minimum and maximum allowable values Pmin, Pmax of the predetermined variable range of evaporator boiling pressure P, and are stored in the ROM 23 at respective predetermined addresses.

If at step 49 it is determined that a relationship of Ted2<Te stands, the program proceeds to steps 50-54 wherein a desired value of air quantity Q is determined through proportional, integral and differential corrections, by the use of the following equation (2), in the same manner as the aforesaid steps 43-47:

$$Q = K7 \times DT + K8 \times S2 + K9 \times DDT \tag{2}$$

where K7, K8 and K9 are constants which are determined experimentally.

The air quantity Q value determined by the equation (2) assumes a value decreasing so as to minimize the difference between the fin temperature Te and the predetermined value Ted2 so that the fin temperature Te is maintained at the predetermined upper limit Ted2, while balancing the heat load on the evaporator 3 and the refrigeration capacity with each other. By supplying the evaporator 3 with a quantity of air Q determined by the above equation (2), proper dehumidification of the cooled air can be obtained even if the capacity of the compressor V is reduced below the value V1.

Depending upon results of sampling of the fin temperature Te, a value of air quantity Q determined at step 54 can be larger than a predetermined value Qd1 at which the air quantity Q should be held. For example, if the air quantity Q is suddenly decreased in response to a value of the fin temperature Te far higher than the upper limit Ted2 so that the fin temperature shows a detected value only slightly above the upper limit Ted2, the resulting calculated value of air quantity Q can have a value considerably larger than the predetermined value Qd1, depending upon set values of the constants K7-K9 of the above equation (2). If this calculated value Q is directly outputted without correction, there occurs a sudden increase in the discharge air quantity, giving an unpleasant feeling to the driver. Therefore, steps 55 and 56 are provided wherein the air quantity Q to be outputted is held at the predetermined value Qd1. To be specific, it is determined at step 55 whether a value of air quantity Q determined at step 54 is larger than or smaller than the predetermined value Qd1. If a relationship Q≦Qd1 stands, the air quantity Q is held at the predetermined value Qd1 at step 56, while if a relationship Q≦Qd1 stands, the program directly proceeds to step 66.

If at the aforementioned step 49 it is determined that the fin temperature value Te is smaller than the predetermined lower limit Ted1, the program proceeds to steps 57-61 wherein proportional, integral and differential correction terms DT, S1 and DDT are determined, and the air quantity Q value is determined on the basis of the determined values DT, S1 and DDT by the use of the following equation (3):

$$Q = K10 \times DT + K11 \times S1 + K12 \times DDT \tag{3}$$

where K10, K11 and K12 are constants which are determined experimentally.

The air quantity Q value determined by the equation (3) assumes a value increasing so as to minimize the difference between the fin temperature Te and the predetermined value Ted1 so that the fin temperature Te is maintained at the predetermined lower limit Ted1, while balancing the heat load on the evaporator 3 and the refrigeration capacity with each other. By controlling the air quantity Q in this manner, even if the compressor capacity V exceeds the value V2, the fin temperature Te is maintained at the predetermined lower limit Ted1, thereby preventing freeze-up of the evaporator 3. Also here, steps 62 and 63 are provided to keep the air quantity Q value from dropping below the predetermined value Qd1, thereby avoiding a sudden drop in the air quantity Q. More specifically, it is determined at step 62 whether a value of air quantity Q determined at step 61 is smaller than or larger than the predetermined value Qd1. If a relationship Q<Qd1 stands, the air quantity Q is held at the predetermined value Qd1 at step 63, while if a relationship Q≦Qd1 stands, the program directly proceeds to step 64. However, if the fin temperature Te does not recover to the predetermined lower limit Ted1 even by increasing the air quantity Q, in other words, if the integral value S1 of difference values DT between the fin temperature Te and the predetermined lower limit Ted1, which has been determined at step 58, is smaller than a negative predetermined value S1min previously stored in the ROM 23, it means that the blower 2 has then reached its maximum capacity. Then, the fin temperature Te cannot be maintained at the predetermined lower limit Ted1 by increasing the air quantity Q, resulting in freeze-up of the evaporator 3. To avoid this freeze-up of the evaporator 3, at step 64 a determination is made as to whether or not the integral value S1 is smaller than the predetermined value S1min, and if a relationship S1≦S1min stands, the compressor capacity V is corected to a smaller value in accordance with the following equation (4) at step 65:

$$V = K13 \times DT + K14 \times S1 + K15 \times DDT \tag{4}$$

where K13, K14 and K15 are constants which are determined experimentally.

If it is determined at step 64 that the integral value S1 is larger than the predetermined value S1min, the program directly proceeds to step 66, hereinafter referred to.

If at step 49 it is determined that the fin temperature Te is lower than the predetermined value Ted1 or higher than the predetermined value Ted2, a flag signal F is set to a value of 1 at step 66 to indicate that control has been effected in control mode II. Then, a value of capacity V determined by the aforementioned equation (1) or (4) and a value of air quantity Q determined by the aforementioned equation (2) or (3) are supplied from the micro processor 20 and applied, to the respective digital-to-analog converters 26, 25, at steps 67 and 68, followed by the program returning to the step 42.

On the other hand, if at step 49 it is determined that the fin temperature Te value lies between the two predetermined values Ted1, Ted2, the program proceeds to step 69 to determine whether the air quantity Q value is larger than, smaller than or equal to the predetermined value Qd1. If a relationship Q<Qd1 or Q>Qd1 stands, the value of air quantity Q determined by the equation (1), if directly applied, cannot make the evaporator heat load and refrigeration capacity balance with each other. Therefore, the determined air quantity Q value is corrected so as to become equal to the predetermined value Qd1. To be specific, if it is determined at step 69 that the relationship Q<Qd1 stands, the program proceeds to step 50 to increase the air quantity Q value, whereas if the relationship Q>Qd1 stands, step 57 is executed to decrease the air quantity Q value.

On the other hand, if it is determined at step 69 that a relationship Q=Qd1 stands, the value of air quantity Q determined by the equation (1) can make the evaporator heat load and refrigeration capacity balance with each other. However, if until the preceding loop control had been effected in control mode II to vary the air quantity Q and the compressor capacity V at the same time, and in the present loop the control mode shifts to the control mode I to hold the air quantity Q at the predetermined value Qd1, while varying the compressor capacity V, there can occur a sudden change in the compressor capacity V, causing hunting. To avoid this disadvantage, at step 70 the fin temperature Te is compared with a predetermined value Te'd1 which is slightly larger than the predetermined value Ted1 and with a predetermined value Te'd2 which is slightly smaller than the predetermined value Ted2, the predetermined values Te'd1, Te'd2 being previously stored in the ROM 23. If it is found that a relationship Te>Te'd2 or Te<Te'd1 stands, it is determined at step 71 or 72 whether or not the flag signal F shows a set value of 1. If the flag signal shows 1, that is, if the control was effected in control mode II in the preceding loop, the program moves to step 50 or 57 to continue the same control of air quantity Q as in the preceding loop. On the other hand, if it is determined at step 71 or 72 that the flag signal F has a set value of 0, or if it is determined at step 70 that a relationship Te'd1≦Te≦Te'd2 stands, the control is then effected in normal control mode I at steps 73, 74 et seq., since there is no fear of a sudden change in the compressor capacity V even if the air quantity Q value is controlled to the predetermined value Qd1. More specifically, at steps 73, 74, a difference DTM1 between the fin temperature Te and the predetermined value Ted1 and a difference DTM2 between the fin temperature Te and the predetermined value Ted2 are determined and stored into the RAM 24 at respective predetermined addresses. Then, at steps 75–77 the integral values S1, S2 and the value of flag signal F are all reset to zero, and at step 78 the air quantity Q value is set to the predetermined value Qd1, followed by execution of the steps 67, 68.

Figure 7:
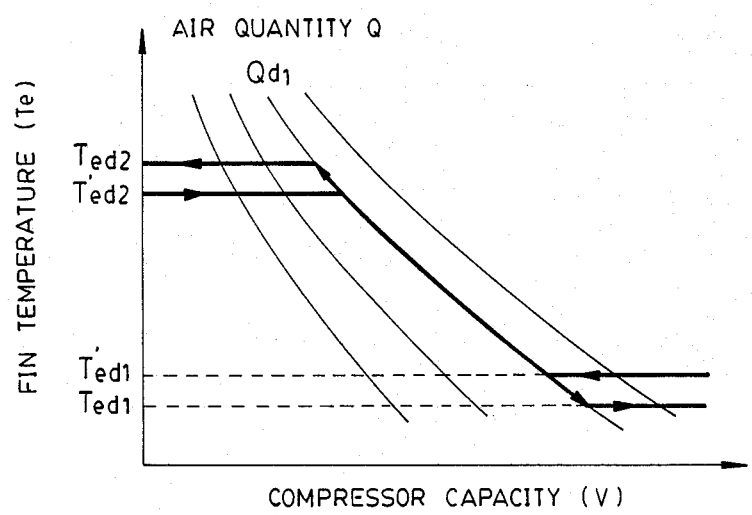
FIG. 7 is a graph showing control characteristics of the control system of FIG. 4.

As stated above, if in the present loop the fin temperature Te satisfies a relationship Te'd2<Te<Ted2 or Te'd1>Te>Ted1 and simultaneolusly the air quantity Q value is equal to the predetermined value 0d1, a different control mode for control of the air quantity Q is employed in the present loop, depending upon whether or not the control mode II starting from the step 50 or 57 was employed for control of the air quantity Q in the preceding loop, thereby providing a hysteresis characteristic as shown in FIG. 7. By virtue of this manner of control, a sudden change in the compressor capacity V and accordingly hunting in the controlled evaporator boiling pressure can be avoided.

Incidentally, if at step 43 it is determined that the control should be effected in dehumidifying mode, steps 79–86 are executed to effect the dehumidifying control, wherein the evaporator boiling pressure is controlled to values within a range enabling proper dehumidification of the cooled air, while neglecting to balance the evaporator heat load and the refrigeration capacity, thereby reducing the power loss.

Although in the foregoing embodiment the capacity or discharge volume of the compressor 4 is varied by varying the quantity of discharge refrigerant gas to the suction side of the compressor 4 by means of the solenoid-operated control valve 9, other suitable means may alternatively be employed such as one adapted to vary the stroke of a piston in a reciprocating compressor, or one adapted to vary the pulley diameter ratio of a belt transmission coupling the engine with the compressor.

Further, although in the embodiment the evaporator boiling pressure sensor is formed by a fin temperature sensor 14, alternatively the evaporator boiling pressure per se may be sensed by a pressure sensor, or the temperature of the inlet pipe of the evaporator 3 may be sensed.

What is claimed is:

1. In a control system for an air conditioning system of the type including a compressor variable in capacity, blower means variable in air quantity to be supplied therefrom, an evaporator for cooling and dehumidifying air supplied from said blower means, said evaporator having a boiling pressure thereof variable in response to the capacity of said compressor and an air quantity supplied from said blower means, said control system being adapted to control the boiling pressure of said evaporator and having sensor means for detecting the boiling pressure of said evaporator, setting means for setting an upper limit and a lower limit defining a predetermined range of the boiling pressure of said evaporator, and determining means for determining whether or not the boiling pressure of said evaporator has reached either said upper limit of said predetermined range or said lower limit thereof;

the improvement comprising:

control means operable to control the capacity of said compressor over a maximum variable range thereof and simultanteously control the air quantity supplied from said blower means so that the boiling pressure of said evaporator is maintained at one of said upper limit of said predetermined range and said lower limit thereof, when it is determined by said determining means that a value of the boiling pressure of said evaporator detected by said sensor means has reached said one of said upper limit of said predetermined range and said lower limit thereof.

2. A control system as claimed in claim 1, wherein said upper limit of said predetermined range of the boiling pressure of said evaporator is set at a value below which said evaporator provides a required dehumidifying capacity.

3. A control system as claimed in claim 1, wherein said lower limit of said predetermined range of the boiling pressure of said evaporator is set at a value above which said evaporator is free from freeze-up.

4. A control system as claimed in claim 1, wherein said determining means is also adapted to determine whether or not a detected value of the boiling pressure of said evaporator lies between said upper limit of said predetermined range and said lower limit thereof, said control means being operable to control the air quantity supplied from said blower means to a predetermined value and simultaneously control the capacity of said compressor so that said air conditioning system provides a desired discharge air temperature, when it is determined by said determining means that said detected value of the boiling pressure lies between said upper limit of said predetermined range and said lower limit thereof.

5. A control system as claimed in claim 1, wherein said vaporator has cooling fins, said sensor means being adapted to detect the temperature of one of said cooling fins as a parameter indicative of the boiling pressure of said evaporator.

6. A control system as claimed in claim 1, wherein said air conditioning system has a discharge passage connected to an outlet of said compressor, a suction passage connected to an inlet of said compresor, a bypass connecting between said discharge passage and said suction passage, and a solenoid-operated control valve disposed across said bypass and having a variable valve opening, said control means being adapted to vary the valve opening of said solenoid-operated control valve to thereby control the capacity of said compressor.

7. A control system as claimed in claim 1, wherein said blower means comprises a motor, and a fan rotatively driven by said motor, said blower means being adapted to supply air in a quantity corresponding to the rotational speed of said motor, said control means being adapted to control the rotational speed of said motor.

8. A control system as claimed in claim 2, wherein said lower limit of said predetermined range of the boiling pressure of said evaporator is set at a value above which said evaporator is free from freeze-up.

9. A control method of controlling an air conditioning system of the type including a compressor variable in capacity, blower means variable in air quantity to be supplied therefrom, an evaporator for cooling and dehumidifying air supplied from said blower means, said evaporator having a boiling pressure thereof variable in response to the capacity of said compressor and an air quantity supplied from said blower means, said control method being adapted to control the boiling pressure of said evaporator by means of electronic computing means in synchronism with generation of a control pulse signal, and comprising the steps of: (1) detecting the boiling pressure of said evaporator; (2) setting an upper limit and a lower limit defining a predetermined range of the boiling pressure of said evaporator; (3) setting a first predetermined value of the boiling pressure of said evaporator which is slightly smaller than said upper limit, and a second predetermined value thereof which is slightly larger than said lower limit; (4) determining whether or not a detected value of the boiling pressure of said evaporator obtained in said step (1) has reached either said upper limit of said predetermined range or said lower limit thereof; (5) determining whether or not the detected value lies between said upper limit and said lower limit; (6) determining whether or not the detected value lies between said upper limit and said first predetermined value or between said lower limit and said second predetermined value; (7) providing a first control mode comprising controlling the air quantity supplied from said blower means to a predetermined value and simultaneously controlling the capacity of said compressor so that said air conditioning system provides a desired discharge air temperature, and a second control mode comprising controlling the capacity of said compressor over a maximum variable range thereof and simultaneously controlling the air quantity supplied from said blower means so that the boiling pressure of said evaporator is maintained at one of said upper limit of said predetermined range and said lower limit thereof which is determined to have been reached in said step (4); (8) determining which of said first and second control modes has been selected in a preceding loop; (9) when it is determined in said step (5) that the detected value of evaporator boiling pressure lies between said upper limit and said lower limit and simulateneously it is determined in said step (6) that the detected value of evaporator boiling pressure does not lie either between said upper limit and said first predetermined value or between said lower limit and said second predetermined value, effecting control under said first control mode, irrespective of the control mode selected in the preceding loop; (10) when it is determined in said step (6) that the detected value of evaporator boiling pressure lies between said upper limit and said first predetermined value or between said lower limit and said second predetermined value and simultaneously it is determined in said step (8) that said first control mode was selected in the preceding loop, effecting control under said first control mode; (11) when it is determined in said step (6) that the detected value of evaporator boiling pressure lies between said upper limit and said first predetermined value or between said lower limit and said second predetermined value and simultaneously it is determined in said step (8) that said second control mode was selected in the preceding loop, effecting control under said second control mode; and (12) when it is determined in said step (4) that the detected value of evaporator boiling pressure has reached either said upper limit or said lower limit, effecting control under said second control mode.

* * * * *